(12) United States Patent
Hayashi

(10) Patent No.: US 8,643,939 B2
(45) Date of Patent: Feb. 4, 2014

(54) ELECTROPHORETIC DISPLAY SHEET AND MANUFACTURING METHOD THEREFOR

(75) Inventor: Kenji Hayashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/355,918

(22) Filed: Jan. 23, 2012

(65) Prior Publication Data

US 2012/0200910 A1 Aug. 9, 2012

(30) Foreign Application Priority Data

Feb. 9, 2011 (JP) ................................. 2011-025928

(51) Int. Cl.
*G02B 26/00* (2006.01)

(52) U.S. Cl.
USPC ........................................................ 359/296

(58) Field of Classification Search
USPC ............................ 359/296–297, 237; 345/107
See application file for complete search history.

(56) References Cited

U.S. PATENT DOCUMENTS

| | | | |
|---|---|---|---|
| 7,499,211 B2 * | 3/2009 | Suwabe et al. ................ | 359/296 |
| 7,656,576 B2 | 2/2010 | Suwabe et al. | |
| 2002/0008898 A1 | 1/2002 | Katase | |
| 2007/0126695 A1 * | 6/2007 | Kishi ............................. | 345/107 |
| 2007/0205979 A1 * | 9/2007 | Bigelow et al. ............... | 345/107 |
| 2007/0268244 A1 * | 11/2007 | Chopra et al. ................ | 345/107 |

FOREIGN PATENT DOCUMENTS

| | | |
|---|---|---|
| JP | 2001-343672 A | 12/2001 |
| JP | 2007-65288 A | 3/2007 |
| JP | 2007-171605 A | 7/2007 |
| JP | 2008-107484 A | 5/2008 |
| JP | 4049202 B | 6/2008 |

\* cited by examiner

*Primary Examiner* — Scott J Sugarman
*Assistant Examiner* — Vipin Patel
(74) *Attorney, Agent, or Firm* — ALG Intellectual Property, LLC

(57) ABSTRACT

An electrophoretic display sheet manufactured by forming on one surface of a first substrate partitions with an opening and applying and forming a binder layer on one surface of a second substrate, and then causing an electrophoretic dispersion liquid containing black particles and white particles dispersed in a dispersion medium to permeate into the binder layer and affixing the first substrate and the second substrate in a direction in which the surface of the binder layer with the electrophoretic dispersion liquid permeated therein and the surface of the partitions are opposite each other, and a method of manufacturing the electrophoretic display sheet are provided.

12 Claims, 9 Drawing Sheets

ELECTROPHORETIC DISPLAY SHEET AND MANUFACTURING METHOD THEREFOR

BACKGROUND

1. Technical Field

The present invention relates to an electrophoretic display sheet and a manufacturing method therefor.

2. Related Art

Electrophoretic display sheets that utilize electrophoresis of particles are commonly used to form image display units of electronic paper, for example. The electrophoretic display sheets are excellent in terms of flexibility and power saving and are particularly suitable as image display units of electronic paper.

An electrophoretic display sheet includes a pair of electrodes disposed opposite each other and a display layer disposed therebetween. The display layer is filled with a dispersion liquid in which, for example, white particles to be positively charged and black particles to be negatively charged are dispersed in a liquid phase dispersion medium. Such an electrophoretic display sheet is configured such that a voltage is applied between the pair of electrodes to cause the white particles and black particles to migrate in an intended direction so as to display a desirable image.

With regard to the configuration of an electrophoretic display sheet, a configuration using a microcapsule in which a dispersion medium including electrophoretic particles is enclosed (hereinafter referred to as an MC method) and a configuration of filling each region divided by a partition with a similar dispersion medium, as in JP-A-2007-65288, (hereinafter referred to as a partition method) are known.

The MC method has, for example, the following advantages. Electrophoretic particles are confined within capsule shells, and therefore less segregation and less sedimentation occur. A binder resin is provided around the capsule shells, and therefore adhesiveness between substrates is obtained. The aperture ratio, which affects display, can be made large. In contrast, the method raises, for example, the following issues. The capsule shells and the binder resin decrease the transparency of the sheet. The display performance is reduced because of a decrease in the space over which electrophoretic particles can migrate. The capsule shells are easily deformed under pressure applied by pushing a display surface, for example, during an input operation on a touch panel.

On the other hand, the partition method has advantages in that, for example, the space over which electrophoretic particles can migrate is large, the partition structure gives resistance to pressure imposed on the display surface, and the high transparency results in high display performance. In addition to these advantages, JP-A-2007-65288 discloses that electrophoretic particles are prevented from condensation by optimizing the height of a partition and thus excellent display characteristics can be achieved.

With the partition method of the electrophoretic display sheet disclosed in JP-A-2007-65288, however, there are problems in that a high sheet strength is hard to obtain, and it is difficult to secure sufficient display quality and reliability.

In particular, as illustrated in FIG. 11A, a pair of a first substrate 10 and a second substrate 20 constituting an existing electrophoretic display sheet 90 are arranged in such a manner as to be basically affixed at their peripheral edge portions by using only a sealant 60, and therefore it is difficult to secure sufficient practical strength. Furthermore, a gap (flow path) g is secured between the crest of a partition 140 formed on the first substrate 10 and the second substrate 20 (a common electrode 21) such that the partition 140 does not completely separate an electrophoretic dispersion liquid. The segregation and sedimentation of electrophoretic particles are likely to occur.

These phenomena, as illustrated in FIG. 11B, become marked particularly in the case of using a flexible substrate that is deformable. There are few portions where the two substrates opposite each other are in contact with each other, and therefore it is difficult to secure sufficient sheet strength. Further, the gap g between the partition 140 and the second substrate 20 is large, which might cause an electrophoretic dispersion liquid to leak. Thus, it is difficult to secure intended display quality, resulting in poor reliability.

SUMMARY

An advantage of some aspects of the invention is that it provides an electrophoretic sheet that has the characteristics of being lightweight, excellent in flexibility, and highly reliable, which are key characteristics of electronic paper, and a display apparatus and an electronic device using the electrophoretic sheets.

A method of manufacturing an electrophoretic display sheet according to a first aspect of the invention includes forming, on a first substrate, partitions for dividing the first substrate into a plurality of regions, applying a binder layer onto a second substrate, causing an electrophoretic dispersion liquid to permeate into the binder layer, the electrophoretic dispersion liquid containing electrophoretic particles of at least one type to be charged positively or negatively, and arranging a surface with the applied binder layer of the second substrate and a surface with the partitions formed thereon of the first substrate opposite each other, and affixing the top of the partitions and the second substrate using part of the binder layer.

With such a method, the top of the partitions and the second substrate are affixed together using the binder layer other than at ends of the electrophoretic display sheet, and thus the strength of the electrophoretic display sheet can be enhanced. The binder layer and the electrophoretic dispersion liquid need not be coated region by region, and the entire surface (excluding edges) can be coated at one time. The number of manufacturing processes can be prevented from increasing.

Therefore, the sheet strength is high even a flexible substrate or the like is used, and excellent display quality can be secured when the sheet is bent. Accordingly, an electrophoretic display sheet that is high in reliability and reduced in manufacturing cost can be provided.

In the method according to the first aspect of the invention, it is preferable that, in the affixing, affixation by being transported between at least two heated rollers be performed.

With such a method, while being transported, the first and second substrates are heated by two heated rollers, thereby softening the binder layer, and, at the same time, pressure provided from the heated rollers causes the partitions to deform part of the binder layer. As a result, the binder layer is bonded. Thus, while the first and second substrates are being transported, the top of the partitions on the first substrate side and the second substrate can be affixed together with the binder layer therebetween.

Accordingly, a large number of electrophoretic display sheets can be produced in a short time, and the strength of the electrophoretic display sheet can be enhanced while its manufacturing cost is reduced.

In the method according to the first aspect of the invention, it is preferable that, in the affixing, thermocompression affixation be performed in a reduced pressure atmosphere.

With such a method, thermocompression in a reduced pressure atmosphere allows effects to be obtained in which the binder layer and the top of the partitions are affixed together while removing air bubbles remaining inside of the holders (cells) with more reliability. Thus, an electrophoretic display sheet with high reliability in which air bubbles are not left in the electrophoretic dispersion liquid can be obtained.

An electrophoretic display sheet according to a second aspect of the invention includes a first substrate having partitions for dividing the first substrate into a plurality of regions provided thereon, and a second substrate having a binder layer formed thereon, the binder layer containing an electrophoretic dispersion liquid in which electrophoretic particles of at least one type to be charged positively or negatively are dispersed. In this electrophoretic display sheet, the first substrate and the second substrate are affixed together using part of the binder layer disposed between the top of the partitions and the second substrate.

With such an electrophoretic display sheet, the binder layer is disposed inside the holder (cell), and when a pushing force is exerted in the vertical direction from the first substrate or the second substrate, the binder layer and the top of the partitions are affixed together and therefore the strength of the electrophoretic display sheet is enhanced. Also, in the case where the first and second substrates are bent by external stress, the partitions are not lifted, which can prevent the electrophoretic dispersion liquid from movement. Thus, effects of preventing reduction in display performance can be obtained even when the substrate bends.

Accordingly, an electrophoretic display sheet with high reliability can be obtained.

In the electrophoretic display sheet according to the second aspect of the invention, it is preferable that the binder layer be layered in a fibrous state on a side of the second substrate.

Thus, the binder layer is formed on the second substrate in such a manner that a large number of fibers are stacked over one another. This allows the space factor in the inside of the binder layer to be enhanced. A larger amount of dispersion medium permeates, which makes movement of electrophoretic particles more easily. The display performance can therefore be improved.

A fibrous structure prevents natural convection of the dispersion medium generated owing to external pressure and temperature changes. This prevents electrophoretic particles from moving from one cell to another cell. Further, when the partitions on the first substrate side are pushed and affixed, deformation can be caused more easily. This can increase the affixation area. This improves the affixation of the binder layer to the partitions.

Accordingly, even when a flexible substrate or the like is used, it is possible to provide an electrophoretic display sheet having high sheet strength and high reliability.

In the electrophoretic display sheet according to the second aspect of the invention, it is preferable that the binder layer be layered in a particulate state on a side of the second substrate.

Thus, the binder layer is formed on the second substrate in such a manner that a large number of particles are stacked over one another. This allows the space factor in the inside of the binder layer to be enhanced. A larger amount of dispersion medium permeates, which makes movement of electrophoretic particles more easily. The display performance can therefore be improved.

A particulate structure prevents natural convection of the dispersion medium generated owing to external pressure and temperature changes. This prevents electrophoretic particles from moving from one cell to another cell. Further, the particulate state allows a larger amount of pigment material or the like to be added in the case of coloring. Improvement in display performance, such as improvement in white density, can therefore be expected.

Accordingly, even when a flexible substrate or the like is used, it is possible to provide an electrophoretic display sheet having high sheet strength, high reliability, and high display performance.

In the electrophoretic display sheet according to the second aspect of the invention, the binder layer may be formed of any of polyurethane, a urea resin, an ester resin, an ether resin, polyethylene, polypropylene, an ethylene vinyl acetate copolymer (EVA), an ethylene methyl methacrylate copolymer (EMMA), an ethylene-cyclic olefin copolymer (a COC resin), an acrylic resin, and a butadiene based elastomer.

Thus, the binder layer is formed of a thermoplastic resin as described above, and therefore heating the second substrate allows the binder layer to be softened and the shape of the binder layer to be changed along the partitions. The affixation area can thereby be increased. A decrease in temperature causes the binder layer to be hardened again, and therefore the affixation strength can be improved. This enables the partitions and the second substrate to be affixed together.

In a region where the binder layer is pushed in using the partitions, the space factor decreases and the electrophoretic dispersion liquid becomes less likely to permeate. This causes each holder (cell) to be approximately separated, which prevents reduction in reliability caused by leakage of the electrophoretic dispersion liquid.

Accordingly, even when a flexible substrate or the like is used, it is possible to provide an electrophoretic display sheet having high sheet strength and high reliability.

In the electrophoretic display sheet according to the second aspect of the invention, it is preferable that the first substrate and/or the second substrate have flexibility.

Thus, the partitions and the binder layer are sufficiently affixed together, which enables the sheet strength to be sufficiently secured even in the case where the first substrate and/or the second substrate is thin and is easily bent. This allows the display performance of the electrophoretic display sheet to be maintained without a lift of the partitions and a leakage of the electrophoretic dispersion liquid across the partitions even when the external stress causes the first substrate and/or the second substrate to be bent or extend. An electrophoretic display sheet with high reliability is thus obtained. Further, in the case where both the first substrate and the second substrate have flexibility, the flexibility of the electrophoretic display sheet becomes very high.

Accordingly, it is possible to provide an electrophoretic display sheet having high reliability as well as having flexibility, and electronic paper that is lightweight and excellent in flexibility can be realized.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
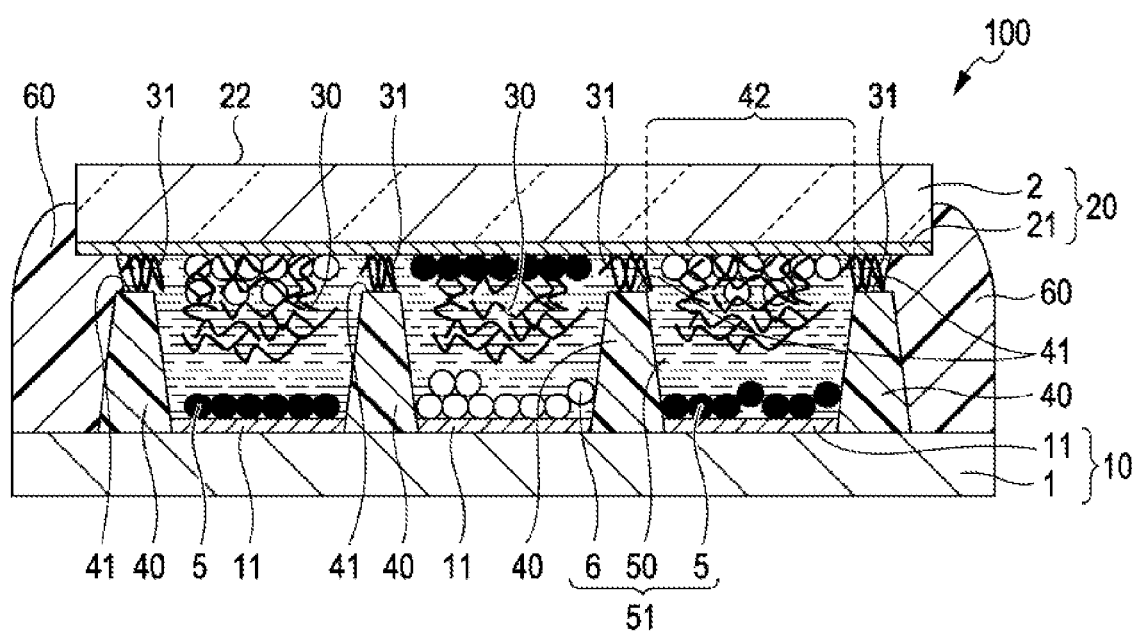
FIG. 1 is a sectional view of an electrophoretic display sheet according to a first embodiment.

An electrophoretic display sheet and a method of manufacturing the same according to the invention will be described in detail below on the basis of preferable embodiments illustrated in the accompanying drawings. Note that the scales of elements and layers in the drawings to be referred to hereinafter will be different from actual scales so that each layer and each member can be adequately recognized.

First Embodiment

1. Configuration of Electrophoretic Display Sheet

An electrophoretic display sheet according to the invention will first be described.

FIG. 1 is a sectional view of an electrophoretic display sheet according to a first embodiment. Note that, for the sake of convenience, in the description below, the upper and lower sides when the drawing in FIG. 1 is viewed from a front side are referred to as "upper" and "lower", respectively.

An electrophoretic display sheet 100 illustrated in FIG. 1 displays a desirable image by making use of migration of electrophoretic particles. The electrophoretic display sheet 100 includes a second substrate (front plane) 20 serving as a display surface and a first substrate (back plane) 10 having a drive circuit and wiring.

The electrophoretic display sheet 100 includes the first substrate 10 and the second substrate 20, on one surface of which first electrodes 11 termed pixel electrodes and a second electrode 21 having optical transparency are provided, respectively. Between these two types of electrodes, partitions 40 are present, and a plurality of holders (cells) 42 separated by the partitions 40 are filled with an electrophoretic dispersion liquid 51 including black particles 5 and white particles 6, which are electrophoretic particles, and a dispersion medium 50.

In the electrophoretic display sheet 100 configured in such a manner, the top surface of the second substrate 20 forms a display surface 22. Note that the display surface 22 is an inside area surrounded by a sealant 60 on the top surface of the second substrate 20 in plan view of the electrophoretic display sheet 100.

The first substrate 10 includes a plurality of first electrodes 11 forming pixels provided on the top surface of a flat base 1 and the partitions 40 for separating the first electrodes 11, and further includes a circuit unit, which is not illustrated. The circuit unit includes, for example, at least one thin film transistor (TFT) (switching element) arranged in a matrix, gate lines and data lines formed so as to correspond to the at least one TFT, a gate driver for applying a desirable voltage to the gate lines, a data driver for applying a desirable voltage to the data lines, and a controller for controlling driving of the gate driver and the data driver.

On the other hand, the second substrate 20 includes, on the bottom surface of a flat base 2, the second electrode 21 having optical transparency and a binder layer 30, and further a high-density binder layer 31 in which a binder material having a high density is present in an area where the binder layer 30 is in contact with a top 41 of the partitions 40. The sealant 60 is provided in contact with the periphery of the first substrate 10 while covering the edge of the second substrate 20. As will be described in more detail below, the binder layer 30 has a configuration that allows inclusion of an electrophoretic dispersion liquid containing electrophoretic particles, and thus electrophoretic particles are in such a state as to migrate in the binder layer 30.

Hereinbelow, the configurations of elements will be sequentially described.

The base 1 and the base 2 are made of sheet-type (flat) members, and have a function of supporting and protecting members disposed therebetween. The bases 1 and 2 each may be either bases that have flexibility or bases that are hard, and are preferably bases that are thin and have flexibility. The use of the bases 1 and 2 having flexibility makes it possible to obtain the electrophoretic display sheet 100 that has flexibility and that is preferable particularly for construction of electronic paper.

In the case of the bases (base material layers) 1 and 2 having flexibility, the constituent material thereof is preferably a material that is excellent in optical transparency, heat-resistance, and dimensional stability. Examples of the material include plastics including polyesters such as polyethylene terephthalate (PET) and polyethylene naphthalate (PEN), polyolefins such as polyethylene, polypropylene, and COP (cyclic polyolefin), polycarbonate, polyamide, thermoplastic polyimide, polyether, polyether ether ketone, polyurethane, and acrylic resins typified by polymethyl methacrylate; rolled metallic foil; and flexible glass. In particular, a material having optical transparency is selected with priority for the base 2 having the display surface 22 among the above-mentioned materials.

The average thicknesses of the bases 1 and 2 are each appropriately set in accordance with the constituent material, the application, and the like and are not particularly limited. In the case of the bases having flexibility, the average thicknesses are preferably about 20 µm or more and 500 µm or less, and more preferably 50 µm or more and 200 µm or less. This allows for reduction of the thickness (and further reducing the weight) of the electrophoretic display sheet 100 while achieving a balance between the flexibility and strength of the electrophoretic display sheet 100.

The first electrodes 11 and the second electrode 21 each having a film shape are provided on surfaces in contact with the electrophoretic dispersion liquid 51 of the bases 1 and 2, namely, the top surface of the base 1 and the bottom surface of the base 2. In the present embodiment, the second electrode 21 is a common electrode, and the first electrodes 11 are individual electrodes (pixel electrodes connected to the TFTs) that are split in a matrix. In the electrophoretic display sheet 100, an area where one first electrode 11 overlaps the second electrode 21 defines one pixel.

The constituent materials for the first electrodes 11 and the second electrode 21 are not particularly limited as long as they are substantially conductive. Examples of the constituent materials include various conductive materials, for example, metal materials such as gold, silver, copper, aluminum and alloys containing these metals; carbon-based materials such as carbon nanotubes, graphene, and fullerene; electron-conducting polymeric materials such as polythiophene, polyacetylene, polyfluorene and their derivatives; ionic conductive polymer materials in which an ionic substance such as NaCl or $Cu(CF_3SO_3)_2$ is dispersed in a matrix resin such as polyvinyl alcohol or polycarbonate; and conductive oxide materials such as tin oxide (SnO), indium tin oxide (ITO), and gallium zinc oxide (GZO), and one of these materials may be used independently or two or more of these materials may be used in combination.

In particular, as a constituent material for the second electrode 21, a carbon-based material such as carbon nanotubes, graphene, or fullerene is preferable among these materials. Using such a material enables the adhesiveness between the second electrode 21 and the binder layer 30 to be enhanced, as describe later, resulting in improvement in the mechanical strength of the electrophoretic display sheet 100.

The average thicknesses of the first electrodes 11 and the second electrode 21 are each appropriately set in accordance with the constituent material, the application, and the like and are not particularly limited. The average thicknesses are preferably about 0.01 μm or more and 10 μm or less, and more preferably 0.02 μm or more and 5 μm or less.

In the present embodiment, the base 2 and the second electrode 21 that constitute the second substrate 20 disposed on the display surface 22 have optical transparency, that is, materials that are substantially transparent (colorless and transparent, colored and transparent, or translucent) are selected for the base 2 and the second electrode 21. This allows the state of the black particles 5 and the white particles 6 in the dispersion medium 50, that is, information (image) displayed on the electrophoretic display sheet 100 to be visually recognized with ease from the side of the display surface 22.

On the surface of the second electrode 21, a thin film layer having adhesiveness, called an interface adhesion layer, (not illustrated) may be provided in order to improve the adhesiveness to the binder layer 30. The material for the interface adhesion layer may be a material system of a type similar to that of the binder layer 30 in consideration of adhesiveness, or may be a thermoplastic adhesive resin such as an ether resin, polyurethane, an ester resin, or an ethylene vinyl acetate copolymer (EVA) or a thermosetting adhesive resin such as an acrylic resin, an epoxy compound, a melamine resin, or a silicone resin.

In addition, in the case where the second electrode 21 is composed of an inorganic material, an organic or inorganic coupling compound, such as a silane coupling agent or organic titanate, is preferably used because it further improves the adhesiveness. With regard to its thickness, a thin film having a thickness of about 0.001 μm or more and 1 μm or less is preferably formed in view of optical transparency and conductivity.

On the periphery of the first substrate 10 and the second substrate 20, the sealant 60 is provided in such a manner as to surround the display surface 22. With the sealant 60, the dispersion medium 50 is hermetically sealed in the inside of the display surface 22. This prevents leakage of the dispersion medium 50 to the outside of the electrophoretic display sheet 100 and infiltration of moisture into the electrophoretic display sheet 100, and thus the display performance of the electrophoretic display sheet 100 can be more reliably prevented from deteriorating.

The constituent material for the sealant 60 is not particularly limited as long as it is an adhesive material having a high water resistance. Examples of the constituent material include thermoplastic resins such as acrylic resins, urethane resins, and olefinic resins, and thermosetting or ultraviolet-curable resins such as epoxy resins, melamine resins, and phenolic resins, and further additives, such as an inorganic particle filler, may be added in order to maintain the water resistance and the strength. One of these materials may be used independently or two or more of these materials may be used in combination.

As described above, in the electrophoretic display sheet 100, the top of the partitions 40 are adhered to the second electrode 21 by using the high-density binder layer 31 so as to prevent the black particles 5 and the white particles 6 contained in the electrophoretic dispersion liquid 51 from leaking from one holder 42 to an adjacent holder 42 divided by the partitions 40.

With the high-density binder layer 31, movement of the black particles 5 and the white particles 6 can be regulated to some extent. However, the binder layer 30, which is the source of high-density binder layer 31, is made of a material through which the dispersion medium 50 very easily permeates, and therefore it is difficult to completely seal the binder layer so as to prevent permeation of the dispersion medium 50 having a high permeability even when the density of the binder layer is increased by applying a voltage thereto. The sealing structure including the sealant 60 is needed. Note that the electrophoretic dispersion liquid 51 is the dispersion medium 50 in which positively or negatively charged black particles 5 and the white particles 6 are dispersed.

As the dispersion medium 50, a dispersion medium that has a low viscosity change and that has a lipophilic property and electrical insulation is preferably used. The boiling point of the dispersion medium 50 is not particularly limited, but is preferably 150° C. or more. Examples of the dispersion medium 50 as mentioned include alcohols such as butanol; cellosolves such as methyl cellosolve; esters such as butyl acetate; ketones such as di-isobutyl ketone; aliphatic hydrocarbons (liquid paraffin) such as n-hexane; alicyclic hydrocarbons such as cyclohexane and norbornene; aromatic hydrocarbons such as trimethylbenzene; halogenated hydrocarbons such as methylene chloride; heteroaromatic rings such as pyridine; nitriles such as acetonitrile; amides such as N,N-dimethylformamide; and carboxylate, silicone oil, and other types of oils. These may be used singly or as a mixture.

Among these materials, as the dispersion medium 50, a dispersion medium mainly composed of aliphatic hydrocarbon (liquid paraffin) or silicone oil is preferable. The dispersion medium 50 mainly composed of liquid paraffin or silicone oil is excellent in transparency, heat resistance, and water resistance and has a high inhibitory effect on aggregation of the black particles 5 and the white particles 6, and therefore is preferable. This can more reliably prevent or suppress deterioration of the display performance of the electrophoretic display sheet 100 with time due to temperature and humidity. Liquid paraffin or silicone oil is excellent in terms of weather resistance because of the absence of an unsaturated carbon covalent bond, and is very safe. In this respect, liquid paraffin or silicone oil is preferable.

When needed, various types of additives may be added to the dispersion medium 50. Examples of the additives include an electrolyte; a surface acting agent (anionic or cationic) such as an alkenyl succinate ester; a charge control agent composed of particles of metal soap, a resin material, a rubber material, oils, varnish, and compounds; dispersion agents such as a silane coupling agent; lubricant agents; and stabilizing agents. In the case of coloring the dispersion medium 50, various types of dyes such as anthraquinone dyes, azo dyes, and indigoid dyes may be dissolved in the dispersion medium 50 when needed.

The black particles 5 are particles that carry charges and can perform electrophoresis in the dispersion medium 50 by the action of an electric field. Any particles may be used as the black particles 5 as long as they are black pigment particles and carry a charge. There is no particular limitation, but at least one type among pigment particles, resin particles, and composite particles of these is preferably used. These particles have advantages in that it is easy to manufacture them and charging of the particles can be controlled with relative ease.

The white particles 6 are particles that carry charges opposite to those of the black particles 5 and can perform electrophoresis in the dispersion medium 50 by the action of an electric field. Any particles may be used as the white particles 6 as long as they are white pigment particles and carry a charge. Further, in the case where the dispersion medium 50 is colored white and in the case where the binder layer 30 is white, the white particles might not be used when not needed.

Examples of a pigment material of which pigment particles are made include black pigments such as aniline black, carbon black, titanium black, and copper chromite; white pigments such as titanium oxide, and antimony oxide; yellow pigments such as azo pigments, such as monoazo, iso-indolinone, and chrome yellow; red pigments such as quinacridone red, and chrome vermilion; blue pigments such as phthalocyanine blue and indanthrene blue; and green pigments such as phthalocyanine green. One of these materials may be used independently or two or more of these materials may be used in combination.

Examples of a resin material of which pigment particles are made include acrylic resins, urethane resins, urea resins, epoxy resins, polystyrene, and polyester. One of these materials may be used independently or two or more of these materials may be used in combination.

Examples of composite particles include those in which the surface of a pigment particle is coated with a resin material or another pigment, those in which the surface of a resin particle is coated with a pigment, and particles made of a mixture in which a pigment and a resin material are mixed in an appropriate content.

Note that as the black particles 5, carbon black particles or carbon black particles coated with an organic compound can be preferably used.

The shape of the black particles 5 is not particularly limited, but is preferably spherical. The average particle size of the black particles 5 is not particularly limited. Preferably, the average particle size is 10 nm or more and 500 nm or less, and more preferably 20 nm or more and 300 nm or less. If the average size of the black particles 5 is less than 10 nm, sufficient chromaticity is not obtained. In this case, the contrast sometimes decreases, causing the display to be obscure. In contrast, if the average size of the black particles 5 exceeds 300 nm, the weight per particle is large. This may facilitate sedimentation and segregation, and may also hinder fast migration of particles in an area where a voltage is applied for display, resulting in a reduced response speed. Note that the average size of the black particles 5 is a volume average particle size measured by using a dynamic light scattering type particle size distribution measurement device (e.g., product name: LB-500 made by HORIBA, Ltd.)

The partitions 40 will next be described. The partitions 40 are formed so as to partition the holders 42 on the first substrate 10 and have a role of adhering the binder layer 30 to the second substrate 20 (the second electrode 21) by pushing the binder layer 30 in the second substrate 20 while heating the binder layer 30. Therefore, as the material for the partitions 40, a resin material having a high heat resistance and a relatively high hardness is preferable. For example, thermosetting resins or ultraviolet-curable resins, such as silicone resins, polyimide, epoxy resins, and acrylic resins are preferable. The softening temperature of the partitions 40 is preferably 150° C. or more. This is for the purpose of preventing the partitions 40 from being softened together with the binder layer 30 in a temperature region where the binder layer 30 is softened and affixed. As the method of forming the partitions 40, printing methods of forming the partitions 40 using gravure printing or screen printing, a photolithography method using a photoresist, and the like are preferable because they can form the partitions 40 with high precision.

The height of the partitions 40 that partition the holders 42 is preferably 10 to 50 μm in consideration of migration and separation of electrophoretic particles. The width of the top 41 of the partitions 40 is preferably as narrow as possible in order to increase the aperture ratio of an opening, and is preferably 1 to 5 μm in consideration of the limitations of forming the high-density binder layer 31 and the strength of the partitions 40. The aspect ratio is preferably 2 to 50. It is more preferable that the sectional structure of the partitions 40 be formed in a tapered shape such that the width of the top 41 of the partitions 40 is narrower than the bottom portion where the partitions 40 is in contact with the first substrate 10 because such a shape can increase the strength without impairing the display performance.

Figure 2A:
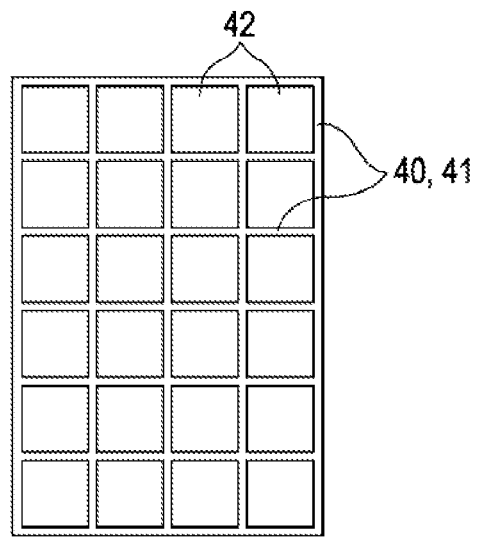
FIG. 2A is a plan view of an example of partitions.
Figure 2B:
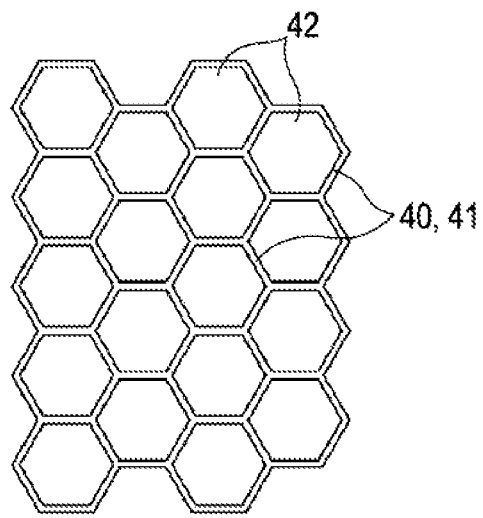
FIGS. 2B and 2C are plan views of other examples of partitions according to an embodiment.
Figure 2C:
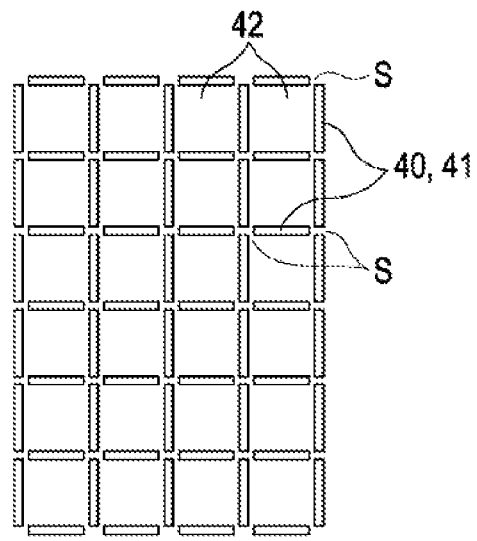

FIG. 2A is a plan view of an example of partitions according to an embodiment. FIGS. 2B and 2C are plan views of other examples of partitions according to an embodiment.

As an exemplary planar shape of the partitions 40, the shape as illustrated in FIG. 2A is preferable. Particularly, the partitions 40 are formed in a grid pattern such that a plurality of rectangular holders 42 are in a matrix. Ideally, it is preferable that the top 41 of the partitions 40 should not be seen from the front from which the electrophoretic display sheet 100 is viewed, and the aperture ratio be high.

To achieve an ideal partition shape, as illustrated in FIG. 2A, the planar shapes (openings) of the holders 42 form a rectangular array. This reduces the area of the top 41 of the partitions 40, enabling the aperture ratio to be higher. Note that the planar shapes of the holders 42 are not limited to rectangles and may be polygons in a continuous structure. For example, as illustrated in FIG. 2B, the planar shapes may be formed in a honeycomb structure where hexagons are arrayed, or in a structure where triangles are arrayed. With these structures, the aperture ratio can be increased as in the case of the rectangular array.

The partitions 40 are not limited to those with which one holder 42 forms one pixel. The partitions 40 need only to divide a display (the display surface 22) into a plurality of regions. For example, the configuration may be such that a plurality of pixels are provided by arranging a plurality of first electrodes 11 in one holder 42.

As illustrated in FIG. 2C, spacing s may be provided at a corner of a polygon in an array to make the corner discontinuous so that air bubbles easily go out. With this structure, even when air bubbles remain in the holder 42, the air bubbles can be efficiently removed in a affixing process.

The binder layer 30 will next be described. Prior to the description, problems that arise when the binder layer 30 is omitted (i.e., when a display sheet of a related-art "partition method" is used) will be explained again with reference to FIGS. 11A and 11B.

Figure 11A:
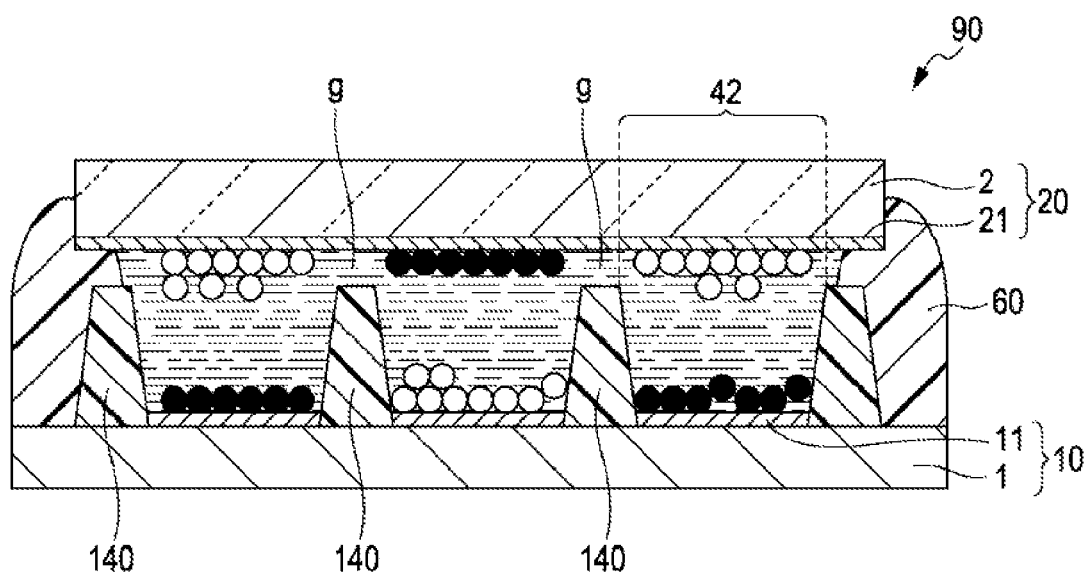
FIG. 11A is a sectional view of an electrophoretic display sheet according to the related art.
Figure 11B:
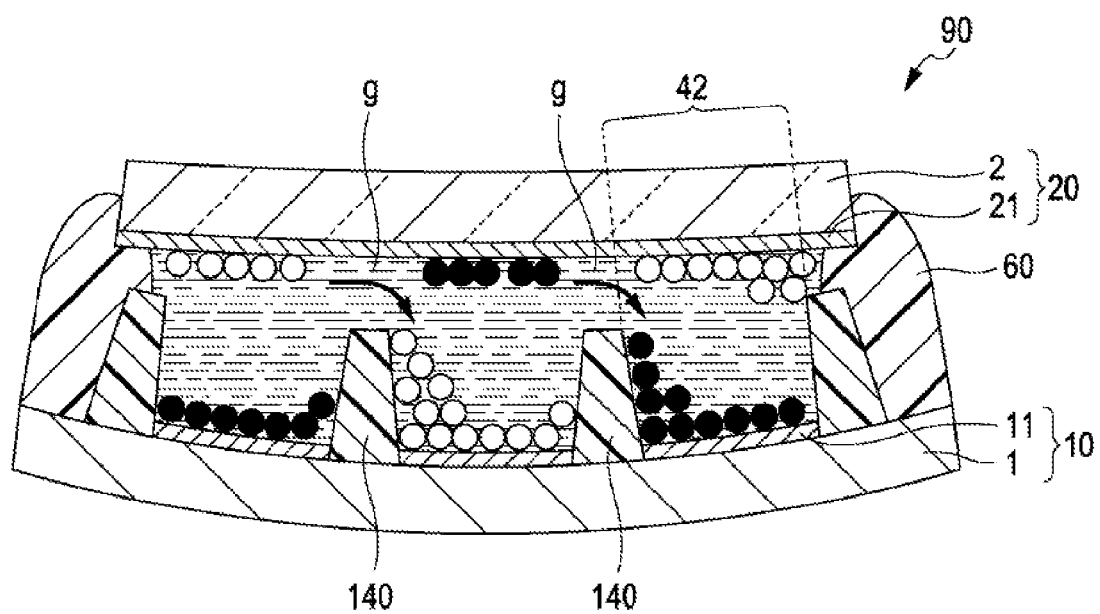
FIG. 11B is a sectional view of an electrophoretic display sheet when the electrophoretic display sheet is bent.

In the electrophoretic display sheet 90 by the partition method without a binder layer of the related art illustrated in FIG. 11A, when the sheet is bent by external forces, the gaps g between partitions 140 and the second substrate 20 expand in a central portion of the sheet as illustrated in FIG. 11B. When, in this state, rewriting is performed by applying a predetermined voltage between electrodes, the black particles 5 and/or the white particles 6 move across the partitions 140 into the adjacent holders 42, as indicated by arrows, and, as a result, the amount of particles in each holder 42 varies. This leads to unevenness in an image.

Furthermore, when the electrophoretic display sheet 90 in a state of being held in one's hand and tilted like a book is visually recognized, the action of gravity causes the black particles 5 and/or the white particles 6 to move down (sedimentation) across the holders 42 in the vertical direction. This produces more marked unevenness in an image. In a pixel where the number of black particles 5 is decreased by the foregoing movement (sedimentation), it is difficult to obtain a low reflectivity (a state in which black level is secured) and therefore the contrast decreases. As such, with the electrophoretic display sheet 90 according to the related art, it is difficult to obtain excellent display characteristics.

Further, when large segregation of the black particles 5 has occurred, it is difficult to disperse the black particles 5 again uniformly for each holder 42. Therefore, resetting may be repeated in order to restore display characteristics, and thus the convenience of the electrophoretic display sheet 90 decreases.

In addition to such a problem, there is a problem in that the electrophoretic display sheet 90 according to the related art is not provided with a member having a function that suppresses a change in thickness when the electrophoretic display sheet 90 is bent, and therefore the thickness of part of the electrophoretic display sheet 90 is largely changed during bending and thus the display characteristics deteriorates. Furthermore, the first substrate 10 and the second substrate 20 are bonded using the sealant 60 only, and therefore it is difficult to enhance the mechanical strength of the electrophoretic display sheet 90.

The binder layer 30 has a function of solving these problems, that is, a function of preventing or inhibiting the black particles 5 and/or the white particles 6 from moving below (sedimentation) in the vertical direction while enhancing the mechanical strength of the electrophoretic display sheet 100, thereby allowing the electrophoretic display sheet 100 to have excellent display characteristics.

Hereinbelow, the binder layer 30 will be described in detail.

As illustrated in FIG. 1, the binder layer 30 is formed on one surface of the second substrate 20 and is provided within the holders 42. A portion in contact with the top 41 of the partitions 40, as the high-density binder layer 31, is adhered to the first substrate 10 (the second electrode 21) with the partitions 40 disposed therebetween.

Moreover, the high-density binder layer 31 has a function of preventing the black particles 5 and/or the white particles 6 from moving across the partitions 40 between their respective holders 42.

The binder layer 30 is an elastic body mainly composed of resin formed in a three-dimensional mesh fashion, and has a feature in that the dispersion medium 50 very easily permeates the formed spatial area. Specifically, the binder layer 30 can be made of a collection of fibers or particles.

In the case of fibers, fibers whose length is 0.01 to 1000 μm are preferable.

In the case of particles, particles whose sizes range from 0.01 to 10 μm are preferable. If the particle sizes are less than 0.01 μm, it is difficult to achieve both the adhesiveness between the top 41 of the partitions 40 and an electrode and a space factor of 50% or more. If the particle sizes exceed 10 μm, the volume of particles when crushed between the partitions and an electrode is large and the particles protrude wider than the top 41 of the partitions 40. The particles having sizes exceeding 10 μm are not preferable.

This embodiment uses, as a preferable example, fibers having a thickness in the same range from 0.01 to 10 μm as in the case of particles are used.

Thus, the binder layer 30 that is excellent in the foregoing functions and has a relatively simple configuration is obtained.

Note that examples of a collection of fibers include a woven body formed by weaving predetermined fibers and a non-woven body formed in such a manner that threads of predetermined fibers are not woven. The binder layer 30 may be formed using the forming characteristic of a urethane resin or the like.

The space factor of the binder layer 30 is not particularly limited. Preferably, the binder layer 30 has a space factor of about 50% or more and 99% or less. This enables the movement path of electrophoretic particles to be sufficiently secured, so that the black particles 5 and the white particles 6 can be smoothly moved through the dispersion medium 50 in the binder layer 30. The space factor of the high-density binder layer 31 is preferably reduced to the range from 1% or more to 50% or less. This is because movement of the electrophoretic dispersion liquid 51 between the holders 42 is regulated so as to prevent display characteristics from decreasing due to segregation of particles.

The elastic modulus of the binder layer 30 is not particularly limited. Preferably, the elastic modulus is about 0.01 MPa or more and 1000 MPa or less. This enables the flexibility of the binder layer 30 to be sufficiently enhanced. Therefore, it is possible not only to easily form in a short time the high-density binder layer 31, which is formed by pushing the partitions 40 in the second substrate 20, but also effectively absorb a difference in coefficients of linear expansion between the first substrate 10 and the second substrate 20 and strain between these substrates produced by external forces such as bending.

The resin material of which the binder layer 30 is made is not particularly limited. As that material, a resin having a molecular weight of 10000 or more is preferable. This enables the binder layer 30 to have a high space factor and excellent flexibility, so that the strength of the electrophoretic display sheet 100 can be enhanced without impairing the flexibility.

As the resin material of which the binder layer 30 is made, a thermoplastic resin is preferable. This facilitates deformation and adhesion of the binder layer 30 by applying heat and pressure to the first substrate 10 and the second substrate 20 and pushing the partitions 40 to the binder layer 30 in an affixing process for forming the high-density binder layer 31, as described later, and thus the high-density binder layer 31 that not only has the strength for adhesion to the partitions 40 but also inhibits electrophoretic particles from moving is produced.

As the resin material of which the binder layer 30 is made, a resin having both a lipophilic group such as an alkyl group, such as a methyl group or an ethyl group, or a phenyl group and a hydrophilic group such as a hydroxyl group, an ester group, a urethane group, an amide group, a urea group, an ether group, an amino group, a carbonyl group, a carboxyl group, a sulfonyl group, a sulfo group, or a siloxane group is preferable. Thus, the binder layer 30 that has an excellent affinity with the dispersion medium 50 and that is prevented from being dissolved into the dispersion medium 50 can be obtained.

Such a resin material preferably has a softening temperature of 50 to 150° C. This is important for forming the high-density binder layer 31. With the resin having a softening temperature of less than 50° C., a sufficient adhesiveness might not be secured in the temperature range in which the resin is used. With the resin having a softening temperature exceeding 150° C., the dispersion medium 50 evaporates during affixation, and therefore a problem of reliability arises. Specifically, examples of the resin material include polyurethanes, urea resins, ester resins, ether resins, amide resin, ethylene-based copolymers such as ethylene vinyl acetate copolymers (EVA resins) and ethylene acrylate copolymers (EAA resins), ethylene methyl methacrylate copolymers (EMMA resins), and ethylene-cyclic olefin copolymers (COC resins). One of these materials may be used independently or two or more of these materials may be used in combination.

As a method of forming the binder layer 30, preferably, the resin material is dispersed in a volatile liquid, and a solution obtained in this way is applied and dried. Examples of the applying method include gravure coating, comma coating, lip coating, die coating, and screen printing, and examples of the thermal drying process include hot-air drying, hot plate drying, and vacuum oven drying. In the case of a photocurable material, ultraviolet irradiation or the like may be performed. After the thermal drying process, a process in which foaming is performed using heated roll processing or the like may be provided. Providing the binder layer 30 having a high space factor in this way makes it possible to improve the display performance and facilitate formation of the high-density binder layer 31 to be pushed on the top 41 of the partitions 40.

The thickness of the binder layer 30 needs to be lower than the partitions 40 and may be in a range from 1 to 49 μm. The binder layer 30 needs only to hold electrophoretic particles on the side of the second substrate 20, and therefore need not be so thick as to reach the first electrodes 11 of the first substrate 10.

The binder layer 30 may be colored white. This can improve the display performance such as contrast. Coloring the binder layer 30 in such a manner enables two-color display (black and white presentation) using only the black particles 5, and therefore the configuration of the electrophoretic display sheet 100 is simplified.

Note that examples of the method of coloring the binder layer 30 include a method of mixing a resin material for the binder layer 30 and a pigment such as an organic pigment or an inorganic pigment.

Figure 3:
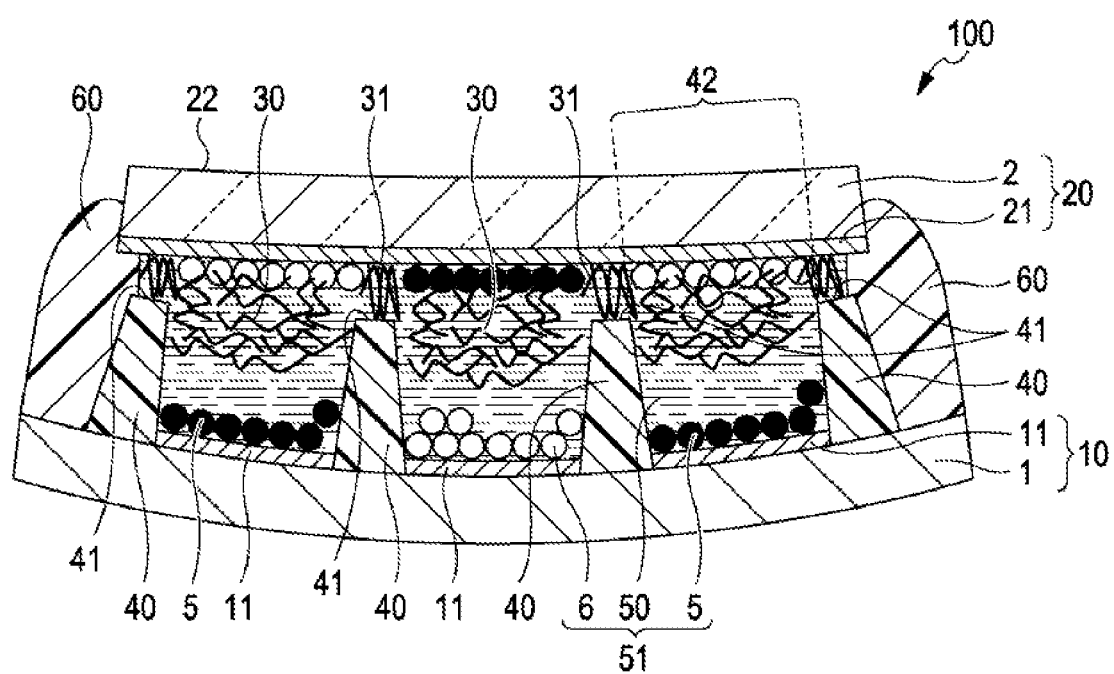
FIG. 3 is a sectional view of an electrophoretic display sheet when the electrophoretic display sheet is bent.

FIG. 3 is a sectional view of the electrophoretic display sheet 100 of this embodiment when bent, which corresponds to FIG. 11B.

As illustrated in FIG. 3, in the electrophoretic display sheet 100 having the binder layer 30, even when rewriting has been performed in the bending state of the electrophoretic display sheet 100, the high-density binder layer 31 is sufficiently adhered to the partitions 40 together, and therefore electrophoretic particles do not move across the partitions 40.

For this reason, the number of particles of each holder 42 is approximately uniform at all times, which results in good display characteristics without unevenness. Furthermore, the high-density binder layer 31 allows the dispersion medium 50 to slightly permeate, and therefore electrophoretic particles slightly permeate the high-density binder layer 31. Accordingly, the shape of the top 41 of the partitions 40 is obscured to be visually less recognizable. Therefore, there are advantages such as further improving the aperture ratio.

Although not illustrated, a color filter layer may be provided in part of the second substrate 20 so as to perform color display. A color filter layer having a green color, a red color or a blue color, or arbitrary light transparency may be provided.

2. Method of Driving Electrophoretic Display Sheet

The electrophoretic display sheet 100 as described above is driven in the following way.

Reference will be made back to FIG. 1.

When a voltage is applied between the first electrode 11 and the second electrode 21, an electric field is generated therebetween. In accordance with the electric field, negatively-charged black particles 5, for example, move (electrophoresis) toward either of two electrodes. White particles 6 are positively charged, which is opposite to the black particles 5, move toward the opposite electrode side.

Such a phenomenon is caused in the inside of each holder 42 (pixel), and a large number of monochrome pixels are combined to perform display. One holder 42 may be used as one pixel. Alternatively, one holder 42 may include a plurality of first electrodes 11 to have a plurality of pixels.

Note that, in the case where the binder layer 30 or the dispersion medium 50 is colored white, display can be similarly driven by the use of the black particles 5 only. That is, black display is achieved when the black particles 5 are collected toward the second electrode 21 on the side of the display surface 22, whereas white display is achieved when the black particles 5 are collected on the side of the first electrode 11 because the colored binder layer 30 becomes seen.

3. Method of Manufacturing Electrophoretic Display Sheet

A method of manufacturing the electrophoretic display sheet 100 will be described below with reference to FIGS. 4A to 4D.

FIGS. 4A to 4D are sectional views of a process of manufacturing an electrophoretic display sheet according to an embodiment.

Figure 4A:
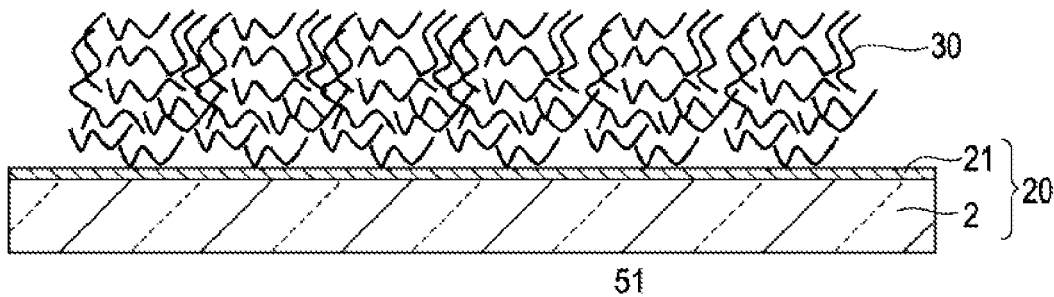
FIGS. 4A to 4D are sectional views illustrating a process of manufacturing an electrophoretic display sheet according to an embodiment.

First, as illustrated in FIG. 4A, the binder layer 30 is formed on the second substrate 20. As a preferred example, the second substrate 20 in which an ITO thin film to be the second electrode 21 is formed by sputtering is prepared on one surface of the base 2 made of PET, and the binder layer 30 is formed over the second electrode 21.

The binder layer 30 is formed in such a way that a fibrous dispersion solution made of a urethane resin dispersed in a mixed solvent of water/ethanol, for example, is applied onto the second electrode 21 by die coating, and then the solvent is removed by hot-air drying.

Figure 4B:
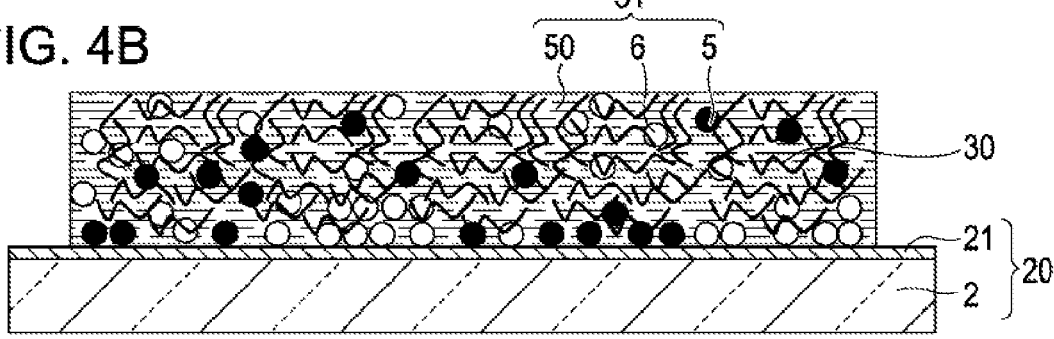

Subsequently, as illustrated in FIG. 4B, the electrophoretic dispersion liquid 51 is applied to the binder layer 30 such that the black particles 5 and the white particles 6 are impregnated into the binder layer 30.

As the method of coating the electrophoretic dispersion liquid 51, for example, various coating methods such as die coating, comma coating, gravure coating, lip coating, screen printing, ink jet coating, and a dipping method may be used.

To facilitate impregnation, pre-processing in which air is removed by pushing the binder layer 30 in with a pressure roller or the like, and then impregnation is promoted by the restoring force of the binder layer 30 may be performed prior to coating.

Figure 4C:
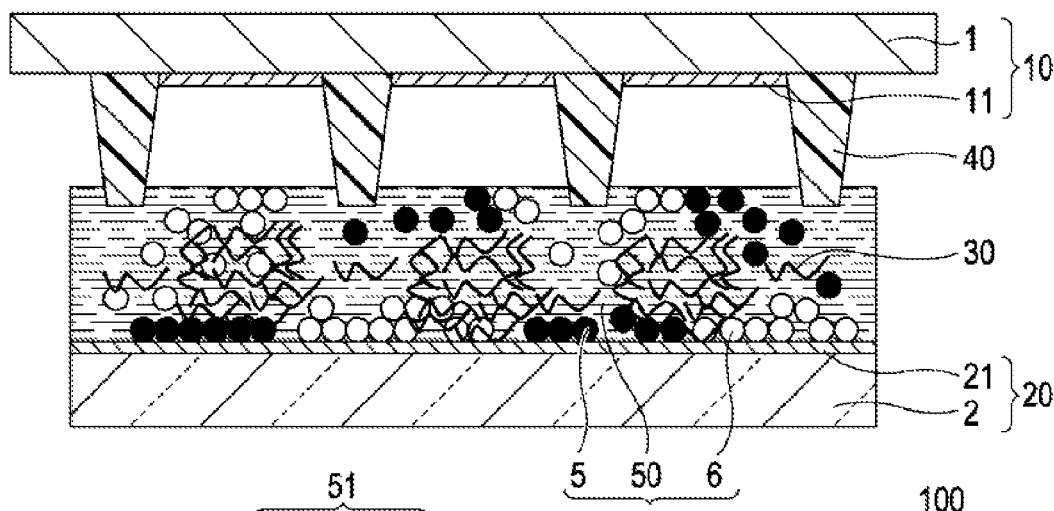

Subsequently, as illustrated in FIG. 4C, the first substrate 10 on which the partitions 40 have been formed is affixed to the second substrate 20. In more detail, the binder layer 30 of the second substrate 20 and the partitions 40 of the first substrate 10 are placed opposite each other and are affixed together.

The binder layer 30 and the partitions 40 are affixed together while being transported, for example, using a thermal roll laminator having at least two rollers pressurized about 0.5 MPa. In such a way, the binder layer 30 is softened and deformed while being pushed by the partitions 40, and, as a result, the binder layer 30 becomes the high-density binder layer 31 and is bonded. The temperature of heat applied by the thermal roll laminator is set higher than the softening temperature of the binder layer and lower than the softening temperature of the partitions 40, for example, in the range from 80 to 120° C.

Thus, formation and bonding of the high-density binder layer 31 can be performed at one time while preventing the dispersion medium 50 from evaporating and preventing the partitions 40 from being softened.

As another affixing method, affixation is performed in a reduced pressure atmosphere. This makes it possible to remove air bubbles more completely. In this case, pressure is preferably applied using a deformation plate of a diaphragm method on a hot plate table.

This method, which is different from the thermal roll laminator, allows sufficient pressure-application time and heat-application time. Without removing air bubbles using a particular structure, such as making the partitions 40 discontinuous as illustrated in FIG. 2C, air bubbles can be removed more surely. In this way, the electrophoretic display sheet 100 with high reliability can be produced.

Figure 4D:
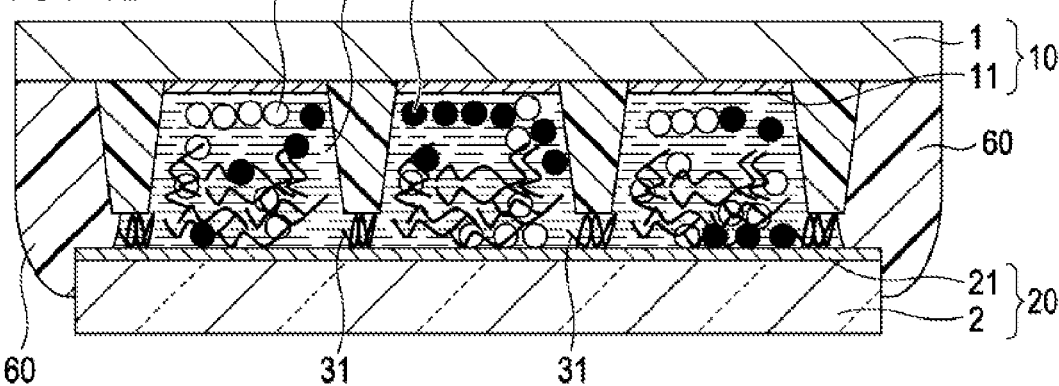

Subsequently, as illustrated in FIG. 4D, the sealant 60 made of an ultraviolet curable epoxy-based adhesive, for example, is applied on the periphery of the first substrate 10 and the second substrate 20.

In this process, when heat is applied again until the temperature is close to that in the previous process, the binder layer 30 and the high-density binder layer 31 are softened again. It is therefore possible to cure and fix the sealant 60 by ultraviolet irradiation while correcting small misalignment between the substrates. Thus, the completely sealed electrophoretic display sheet 100 is achieved.

As described above, the manufacturing method includes forming, on a first substrate 10, partitions 40 for defining pixels, applying a binder layer 30 onto a second substrate 20. Further, the manufacturing method includes causing an electrophoretic dispersion liquid 51 to permeate into the binder layer 30, and affixing the top 41 of the partitions 40 and the second substrate 20 using part of the binder layer 30.

With such a manufacturing method, the electrophoretic display sheet 100 can be manufactured in a relatively simple manner and at low cost.

Note that the method of forming the binder layer 30 is not limited to the foregoing method. For example, the following method may be used.

That is, the binder layer 30 may be formed such that a coating liquid is applied in which an emulsion such as polyester polyol, polyether polyol, or polyurethane polyol for imparting thermal plasticity is added to a water dispersion isocyanate prepolymer, and then the coating liquid is placed under conditions of high temperature and high pressure, and, as a result, foaming is performed using carbon dioxide produced by three-dimensional urea cross-linking. The sheet-type binder layer 30 that has been prepared in advance may be attached to the surface of the second substrate 20 using a heated roll or the like.

As described above, with the electrophoretic display sheet 100 according to this embodiment, the following effects can be obtained.

The first substrate 10 and the second substrate 20 are affixed together using the high-density binder layer 31 at the top 41 of the partitions 40, in addition to by bonding with the sealant 60 in a peripheral edge portion.

Thus, the strength of the electrophoretic display sheet 100 can be enhanced. Further, even when rewriting has been performed in the bending state of the electrophoretic display sheet 100, the top 41 of the partitions 40 is adhered to the second substrate 20 using the high-density binder layer 31. It is therefore possible to prevent electrophoretic particles from moving between adjacent holders 42.

For this reason, the number of particles of each holder 42 is approximately uniform at all times, which results in good display characteristics without unevenness in an image.

The binder layer 30 and the electrophoretic dispersion liquid 51 need not be coated separately from one region to another, and the entire surface (excluding edges) can be coated at one time. The number of manufacturing processes can be prevented from increasing.

Therefore, the sheet strength is high even when a flexible substrate or the like is used, and excellent display quality can be secured when the sheet is bent. Accordingly, the electrophoretic display sheet 100 that achieves excellent manufacturing efficiency and high reliability can be provided.

Second Embodiment

Figure 5:
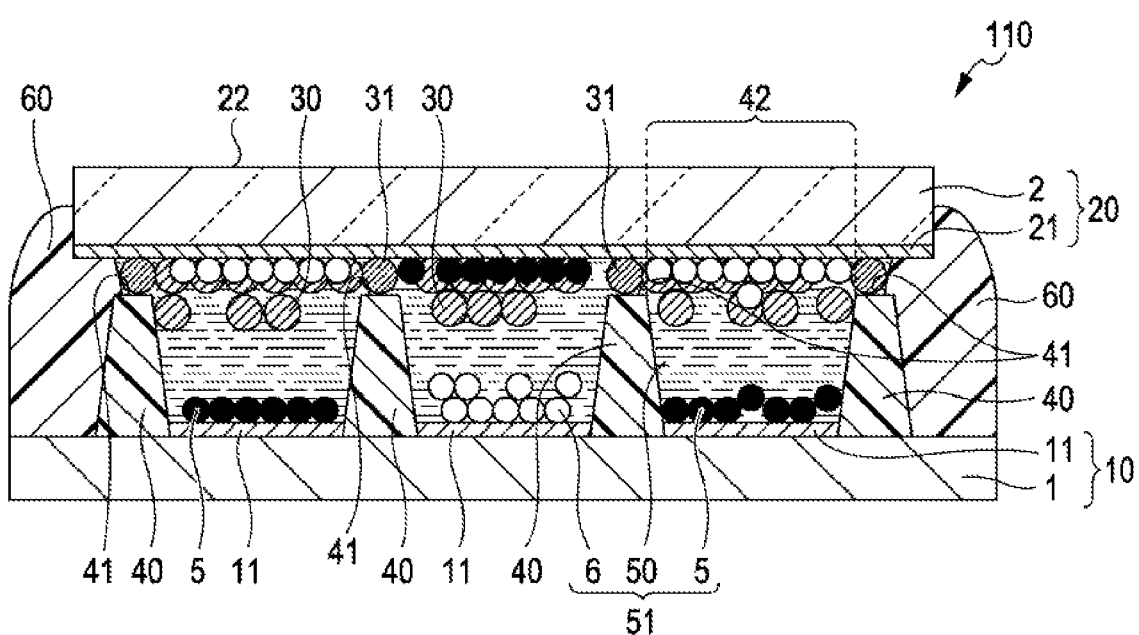
FIG. 5 is a sectional view of an electrophoretic display sheet according to a second embodiment.

FIG. 5 is a sectional view of an electrophoretic display sheet according to a second embodiment, which corresponds to FIG. 1.

Hereinbelow, an electrophoretic display sheet 110 according to this embodiment will be described with reference to FIG. 5. Note that the same elements as in the first embodiment are denoted by the same numerals, and the same description is not repeated.

The electrophoretic display sheet 110 is the same as the electrophoretic display sheet 100 of the first embodiment, except that the binder layer 30 is formed of particles.

As illustrated in FIG. 5, in the electrophoretic display sheet 110, the resin of the binder layer 30 is not in a fibrous shape but in a particulate shape.

In such a manner, when colored white, the binder layer 30 in a particulate shape is more advantageous than that in a fibrous shape of the first embodiment. Because of the particulate shape, it becomes easy to increase the content of white pigments to be added and to vary the refractive indice of the dispersion medium 50 and the binder layer 30 to cause scattering of incident light to be more even. Further, in the case of the particulate shape, a hollow structure is employed, so that gas is confined. This increases the scattering of incident light, so that whiteness can be increased.

Thus, use of the particulate binder layer 30 exhibiting a white color allows the display performance that is high in contrast to be obtained with one type of particles. Only the black particles 5 may be dispersed in the dispersion medium 50, and a manufacturing method and a driving method similar to those in the first embodiment can be used. In such a way, reducing members enables the electrophoretic display sheet 110 to be manufactured at lower cost.

As described above, with the electrophoretic display sheet 110 according to this embodiment, the following effects can be obtained.

Even if the binder layer 30 is in a particulate shape, actions and effects similar to those of the fibrous binder layer are obtained.

Accordingly, the electrophoretic display sheet 110 that achieves excellent manufacturing efficiency and high reliability can be provided.

It should be noted that the invention is not limited to the foregoing embodiments, and various changes and improvements can be added to the foregoing embodiments. A modification will be described below.

Modification

Figure 6A:
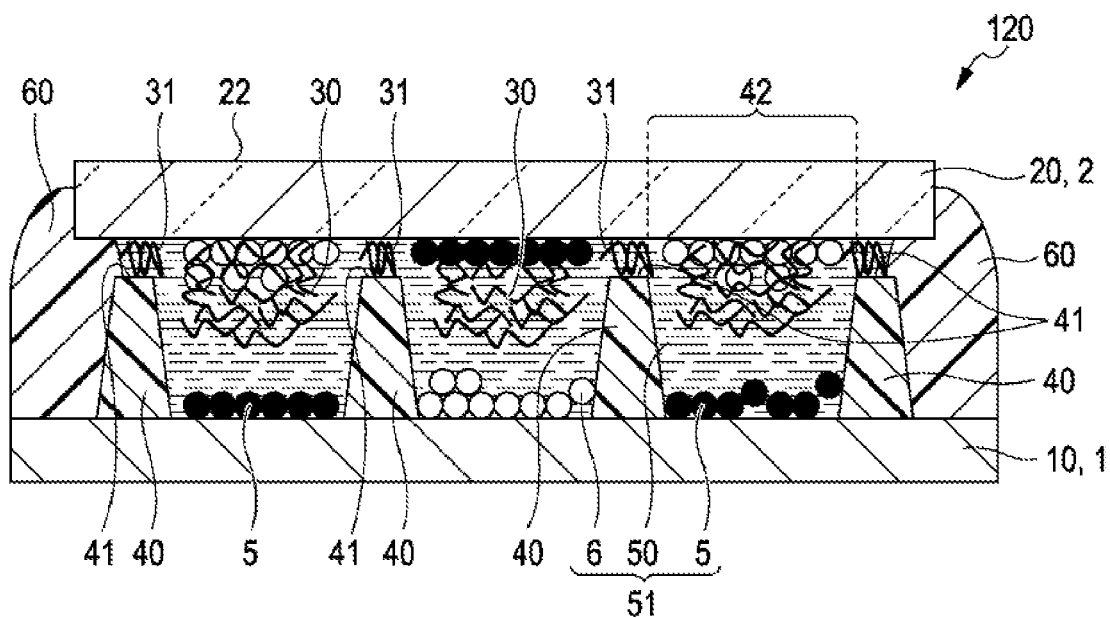
FIG. 6A is a sectional view of an electrophoretic display sheet according to a modification.
Figure 6B:
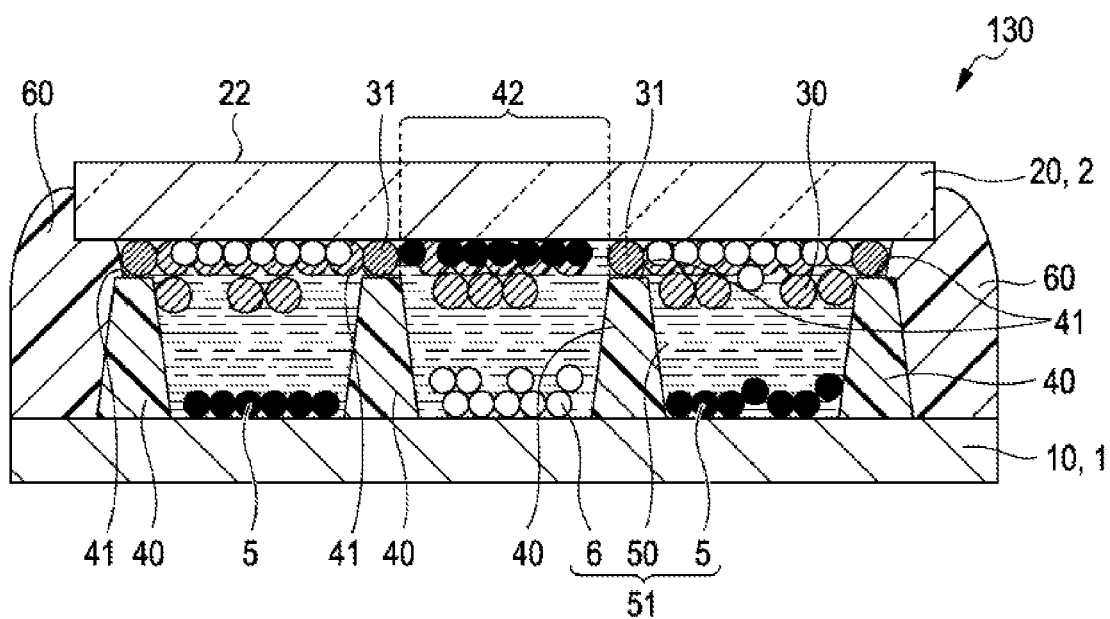
FIG. 6B is a sectional view of another example of an electrophoretic display sheet.

FIG. 6A is a sectional view of an electrophoretic display sheet according to a modification, which corresponds to FIG. 1. FIG. 6B is a sectional view of a different example of the electrophoretic display sheet according to the modification, which corresponds to FIG. 5. Note that the same elements as in the first embodiment are denoted by the same numerals, and the same description is not repeated.

An electrophoretic display sheet 120 according to this modification illustrated in FIG. 6A is the same as the electrophoretic display sheet 100 of the first embodiment, except that the circuit unit, the first electrode 11, and the second electrode 21 are not present. That is, in the electrophoretic display sheet 120, electrodes, wiring, switching elements, and the like for rewriting in pixels (the holders 42) are not provided.

The electrophoretic display sheet 120 in such a manner performs rewriting by using an external display input device. The electrophoretic display sheet 120 is brought into contact with a terminal of the external display input device, so that a current is applied to each of a multiple of pixels arranged in the electrophoretic display sheet 120 so as to perform rewriting. In other words, the electrophoretic display sheet 120 is a rewritable sheet that does not have a display rewiring function (configuration) by itself. However, the electrophoretic display sheet 120 can rewrite display using a rewritable printer designed specifically therefor.

Likewise, the electrophoretic display sheet 110 illustrated in FIG. 5 can be made as a rewritable sheet. Specifically, as illustrated in FIG. 6B, the first electrode 11, the second electrode 21, and the circuit unit for supplying a driving voltage to electrodes may be removed from the configuration of the electrophoretic display sheet 110.

In this manner, an electrophoretic display sheet 130 as a rewritable sheet according to this modification is configured. Note that a difference between the electrophoretic display sheet 120 and the electrophoretic display sheet 130 is whether fibers are used or particles are used as the constituent material for the binder layer 30.

Figure 7:
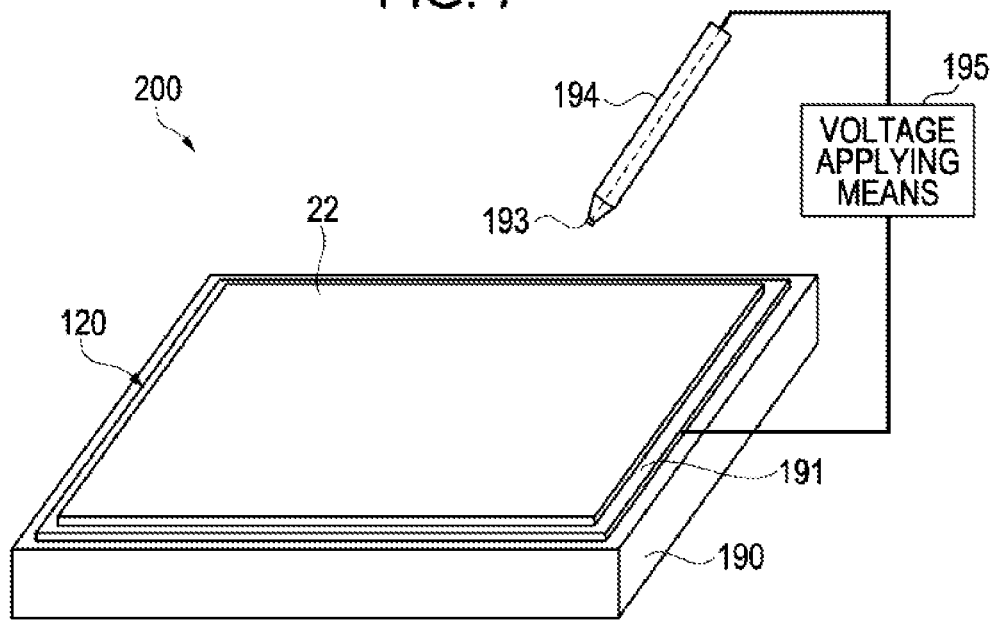
FIG. 7 is a perspective view illustrating an example of a writing device.

FIG. 7 is a perspective view illustrating an example of a writing device.

As an example of the aforementioned rewritable printer, a writing device 200 is mentioned.

The writing device 200 is a device used for writing a desirable image (e.g., a pattern, a color, a character, or a picture, or a combination of these) in the aforementioned electrophoretic display sheet 120.

The writing device 200 as illustrated in FIG. 7 is made up of a base 190, a sheet-like common electrode 191 provided on the base 190, a writing pen (input tool) 194 with a partial electrode 193 provided at the tip thereof, voltage applying means 195 for applying a voltage between the common electrode 191 and the partial electrode 193, and so on.

Writing to the electrophoretic display sheet 120 using the writing device 200 is performed as follows.

First, the electrophoretic display sheet 120 whose entire display surface 22 is in a state of displaying white is mounted on the common electrode 191 of the writing device 200 such that the display surface 22 faces upward.

Subsequently, a voltage for causing the side of the partial electrode 193 to be at a low potential is applied between the common electrode 191 and the partial electrode 193 using the voltage applying means 195.

In this state, the writing pen 194 is moved along a desirable path while being in contact with the display surface 22. In an area corresponding to the path, migration of particles thereby occurs, causing the displayed color to vary from white to black.

With the writing device 200 in such a manner, desirable information such as characters and pictures can be represented on the display surface 22 of the electrophoretic display sheet 120 just like drawing characters and the like on a sheet of paper with a pencil.

The electrophoretic display sheet 120 is capable of being freely attached to and detached from the base 190, and therefore the electrophoretic display sheet 120 on which information is displayed can be easily carried just like paper.

Note that when the electrophoretic display sheet 130 is used, it can be handled like the electrophoretic display sheet 120, and actions and effects similar to those of the electrophoretic display sheet 120 can be obtained.

While a rewritable printer of a handwriting input method has been described here, a device with which a document or image data such as an illustration created using a personal computer (PC) are written may be used.

In this case, in place of the common electrode 191, a pixel electrode unit made up of a plurality of pixel electrodes corresponding to pixels (holders) of the electrophoretic display sheet 120 is disposed. In place of the writing pen 194, a common electrode covering the display surface 22 is disposed.

Likewise, in the description of the first embodiment, a driving voltage is applied to the pixel electrodes and the common electrode. Note that a driving voltage at this point is a driving voltage based on image data (gray-scale data) from the PC. This allows image data created by the PC to be easily written to the electrophoretic display sheet 120 (130).

Electronic Devices

The electrophoretic display sheets according to embodiments of the invention may each be incorporated in various electronic devices. Examples of the electronic devices including the electrophoretic display sheets may include electronic paper, an electronic book, a television set, a view-finder type or direct-monitoring type video tape recorder, a car navigation device, a pager, an electronic organizer, a calculator, electronic newspaper, a word processor, a personal computer, a work station, a videophone, a POS terminal, and a device including a touch panel.

Among these electronic devices, electronic paper is taken as an example and will be specifically described.

Figure 8:
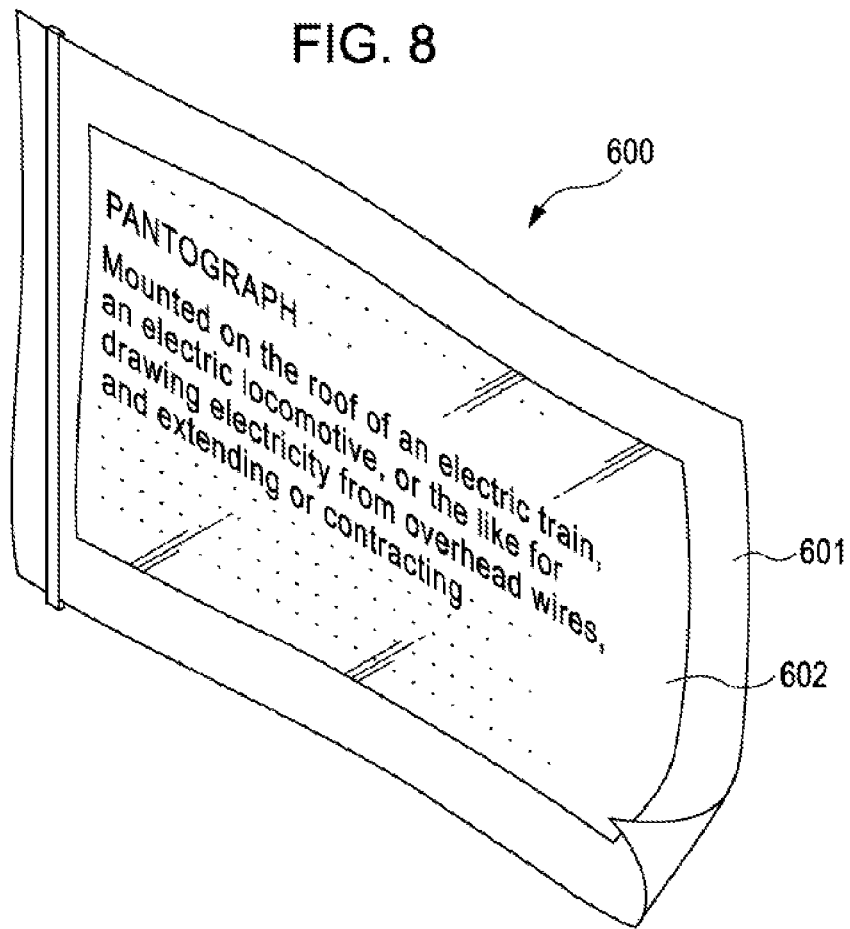
FIG. 8 is a perspective view illustrating an example of electronic paper as an electronic device.

FIG. 8 is a perspective view illustrating an example of electronic paper as an electronic device.

Flexible-type electronic paper 600 includes a main body 601 made of a rewritable sheet having a texture and flexibility similar to those of paper, and a display unit 602. In the electronic paper 600 in such a manner, the display unit 602 corresponds to the foregoing electrophoretic display sheets 100 to 130.

Next, a description will be given of an embodiment in which the aforementioned electrophoretic display sheet is used as a display of an electronic device.

Figure 9:
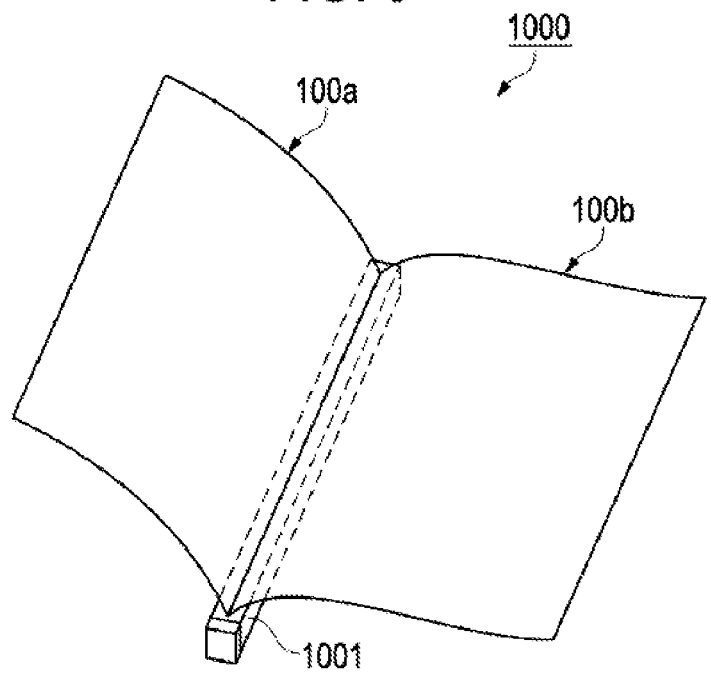
FIG. 9 is a perspective view illustrating an example of an electronic book as an electronic device.

FIG. 9 is a perspective view illustrating an example of an electronic book as an electronic device.

An electronic book 1000 is a portable-type electronic book in which a plurality of electrophoretic display sheets 100a and 100b are bound in a main body section 1001 with a battery, a communication device, a driving IC, and the like built therein. FIG. 9 illustrates a configuration with two electrophoretic display sheets forming pages of the electronic book. However, the number of sheets may be three or more. These sheets are provided to be attachable to and detachable from the main body section 1001, and can be carried alone.

Figure 10:
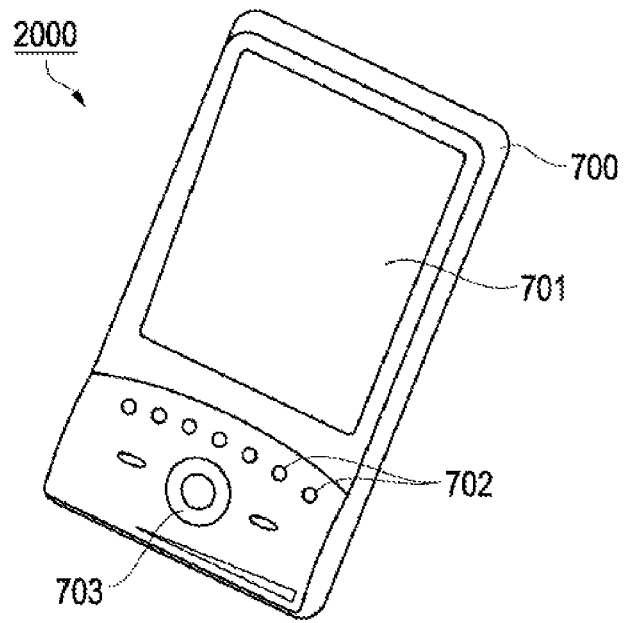
FIG. 10 is a perspective view illustrating an example of a smartphone as an electronic device.

FIG. 10 is a perspective view illustrating an example of a smartphone as an electronic device.

A smartphone 2000 is a portable-type information terminal device in which a display 701, a plurality of operation buttons 702, a click wheel board 703, and so on are integrated in a rectangular enclosure 700. Inside the enclosure 700, a battery, a microphone, a speaker, a communication device, a driving IC, and so on are built. The foregoing electrophoretic display sheet 100 (110) is mounted on the display 701.

As described above, an electrophoretic display sheet, a display apparatus, and an electronic device according to the invention have been described on the basis of the embodiments illustrated in the drawings. However, this invention is not limited to this, and the configurations of elements may be replaced with those having similar functions and arbitrary configurations. Other arbitrary constituents may be added to the invention. Embodiments may be appropriately combined. In the foregoing embodiments, the case where particles contained in a dispersion liquid are black, or a mixture of white and black have been described. However, the color of particles is not limited to this, and may be a chromatic color such as blue, red, or green.

The entire disclosure of Japanese Patent Application No. 2011-025928, filed Feb. 9, 2011 is expressly incorporated by reference herein.

What is claimed is:

1. A method of manufacturing an electrophoretic display sheet, comprising:
    forming, on a first substrate, partitions for dividing the first substrate into a plurality of regions;
    applying a binder layer onto a second substrate;
    applying an electrophoretic dispersion liquid to the binder layer, the electrophoretic dispersion liquid containing electrophoretic particles of at least one type to be charged positively or negatively, wherein the electrophoretic dispersion liquid permeates into the binder layer;
    arranging a surface of the second substrate having the applied binder layer and a surface of the first substrate having the partitions formed thereon opposite each other, with a gap between the tops of the partitions and the second substrate; and
    affixing the tops of the partitions and the second substrate using a part of the binder layer disposed in the gap, wherein the gap is maintained between the tops of the partitions and the second substrate.

2. The method according to claim 1, wherein, in the affixing, affixation by being transported between at least two heated rollers is performed.

3. The method according to claim 1, wherein, in the affixing, thermocompression affixation is performed in a reduced pressure atmosphere.

4. The method according to claim 1, wherein the affixing adheres the binder layer to the tops of the partitions and to the second substrate.

5. The method according to claim 1, wherein a density of the part of the binder layer disposed in the gap is formed to be greater than a density of a part of the binder layer disposed outside of the gap.

6. An electrophoretic display sheet comprising:
    a first substrate having partitions for dividing the first substrate into a plurality of regions provided thereon;
    a second substrate affixed to the first substrate;
    a binder layer formed on the second substrate; and
    an electrophoretic dispersion liquid in which electrophoretic particles of at least one type charged positively or negatively are dispersed, the electrophoretic dispersion liquid being permeated in the binder layer,
    wherein the first substrate and the second substrate are disposed opposite each other with a gap between tops of the partitions and the second substrate and at least part of the binder layer disposed in the gaps between the tops of the partitions and the second substrate.

7. The electrophoretic display sheet according to claim 6, wherein the binder layer is layered in a fibrous state on a side of the second substrate.

8. The electrophoretic display sheet according to claim 6, wherein the binder layer is layered in a particulate state on a side of the second substrate.

9. The electrophoretic display sheet according to claim 6, wherein the binder layer is formed of any of polyurethane, a urea resin, an ester resin, an ether resin, polyethylene, polypropylene, an ethylene vinyl acetate copolymer (EVA), an ethylene methyl methacrylate copolymer (EMMA), an ethylene-cyclic olefin copolymer (a COC resin), an acrylic resin, and a butadiene based elastomer.

10. The electrophoretic display sheet according to claim 6, wherein the first substrate and/or the second substrate has flexibility.

11. The electrophoretic display sheet according to claim 6, wherein a density of the at least part of the binder layer disposed in the gaps between the tops of the partitions and the second substrate is greater than a density of a part of the binder layer disposed in the plurality of regions outside of the gaps.

12. The electrophoretic display sheet according to claim 6, wherein at least one partition is tapered such that a width of the top of the at least one partition is narrower than a width of a bottom portion of the at least one partition that contacts the first substrate.

* * * * *